June 27, 1961 P. MARSAL 2,990,441
GALVANIC BATTERY
Filed April 5, 1946 2 Sheets-Sheet 1
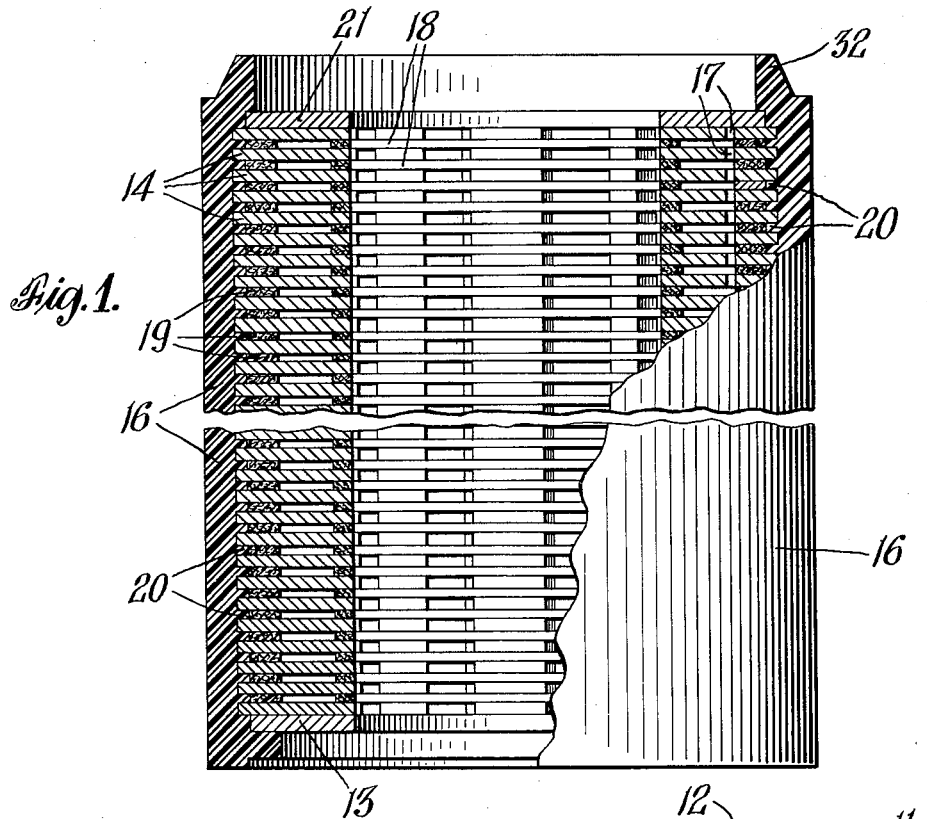
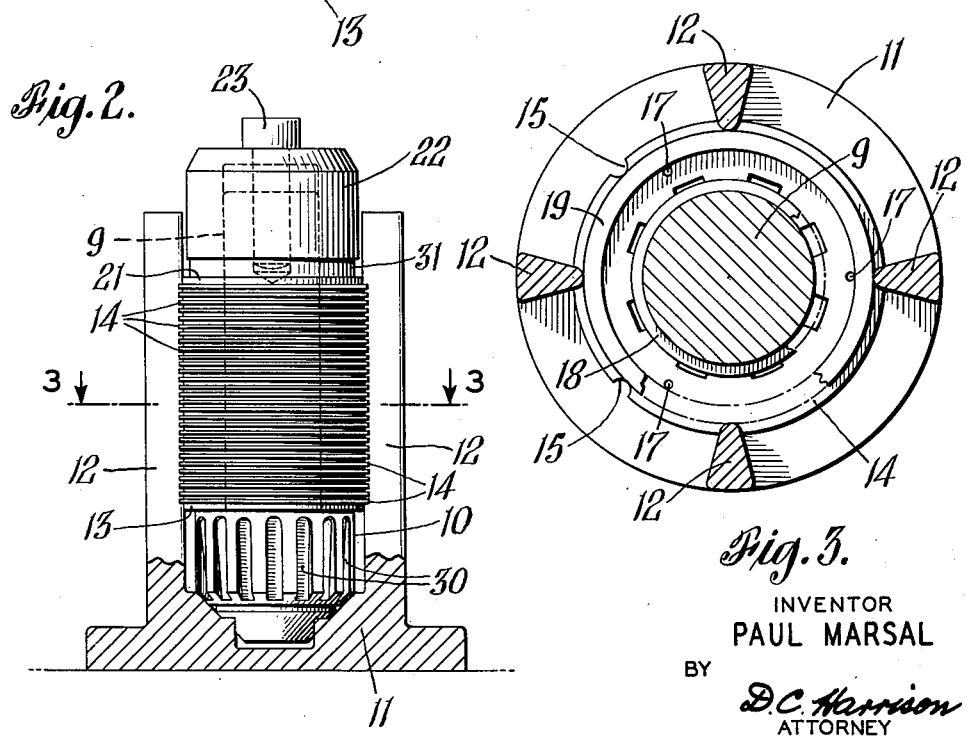
INVENTOR
PAUL MARSAL
BY
D.C. Harrison
ATTORNEY June 27, 1961

P. MARSAL 2,990,441

GALVANIC BATTERY

Filed April 5, 1946

INVENTOR
PAUL MARSAL
BY
D.C. Harrison
ATTORNEY

2,990,441
GALVANIC BATTERY

Paul Marsal, Rocky River, Ohio, assignor, by mesne assignments, to the United States of America as represented by the Secretary of the Navy
Filed Apr. 5, 1946, Ser. No. 659,683
3 Claims. (Cl. 136—90)

The subject of this invention is a compact multi-cell galvanic battery wherein improved methods of spacing, insulating and supporting the electrodes are provided.

In constructing multi-cell batteries, it has heretofore been the practice to space, insulate and support each electrode in a separate operation, one such method requiring the repeated application of a wrapping and an adhesive. According to this invention the electrodes are supported and spaced by means of a unitary plastic sleeving having integral projections adjacent to said electrodes serving to insulate them from one another. This sleeving is applied around the electrodes by injection molding; the electrodes with suitable spacers between them being clamped together under a pressure greater than the molding pressure. The spacers between the electrodes do not extend to the edges of the electrodes so that the integral projections on the plastic sleeving serving to support and align the electrodes are formed during the injection molding of the sleeving. During the molding operation, sufficient compressive force must be maintained between the electrodes and the spacers so that the plastic does not flow between the spacers and the electrodes to any appreciable extent.

The invention will now be described with reference to the attached drawings. The battery construction illustrated represents a deferred-action cell type more completely described in my copending applications Serial Nos. 501,001, now U.S. Patent 2,806,815, and 639,278, now U.S. Patent 2,886,664, and the present invention is principally, but not exclusively, concerned with a method of spacing, insulating and supporting the electrodes of a multi-cell battery which may be employed in the construction of the particular battery described in said applications.

In the drawings,

FIGURE 1 is a sectional view of the battery showing the molded sleeving with integral projections spacing, supporting and insulating the electrodes.

FIGURE 2 is a side elevation showing the method of assembling the electrodes and spacers on a mandrel which serves as the core of the injection mold.

FIGURE 3 is a sectional view along the line 3—3 of the unit shown in FIGURE 2.

Figure 4:
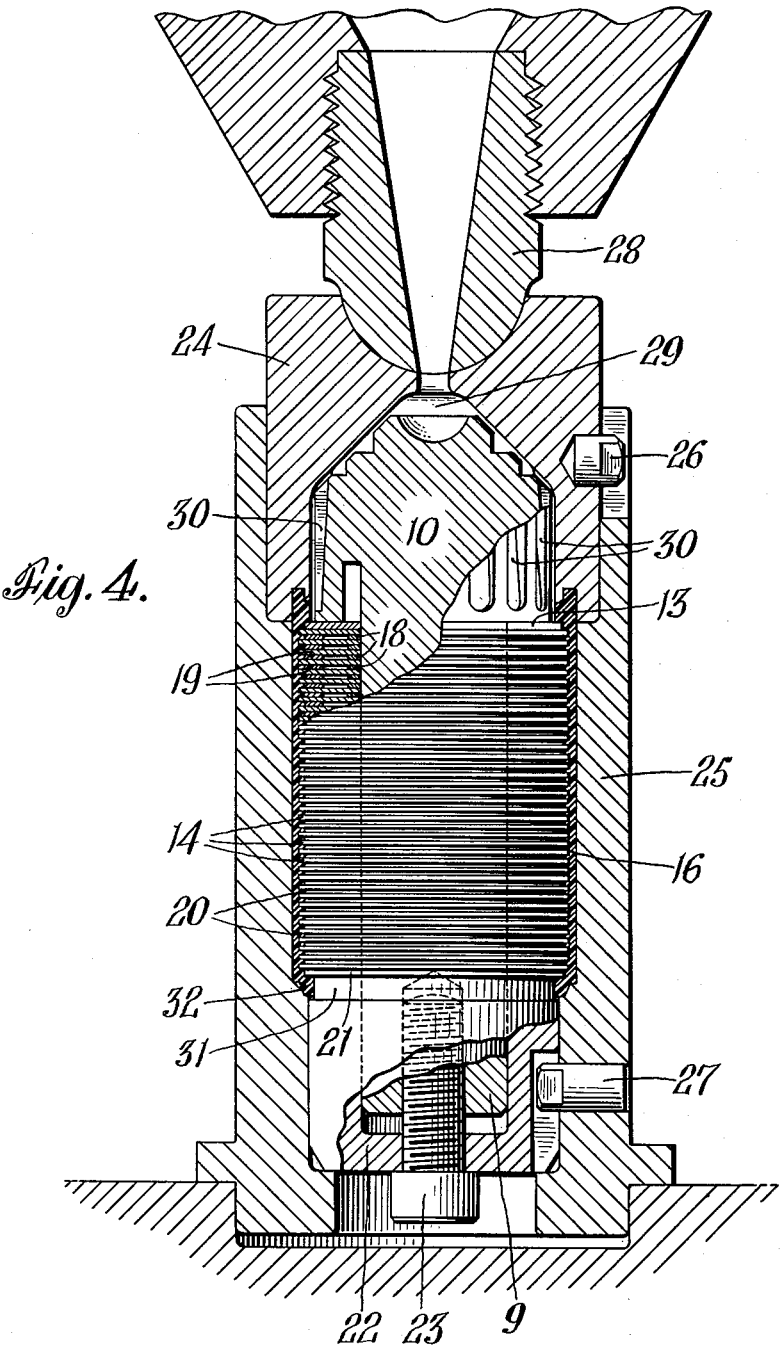
FIGURE 4 is a sectional view of the nozzle of the injection molding machine and the injection mold.

With reference to FIGURES 1, 2 and 3 of the drawings, the manner of assembling the electrodes consists in placing the mandrel 10, in a support 11 having four equally spaced arms 12. This mandrel serves as the core in the injection molding machine. A suitable support 13 for the electrode pack is placed over the solid cylindrical rod 9 forming part of the mandrel 10. This support is in the form of an annular disc and may be constructed of metal or of a rigid plastic material. On the top of the support is placed an electrode 14, comprising an annular disc which may have a metallic zinc surface on one side and a carbon surface on the other side. Each electrode has four equally spaced indentations which mesh with the triangular shaped arms 12 of the supporting device for accurate alignment. Other indentations 15 on the periphery of the electrode may be present to allow for the passage of wiring between the outer jacket 16 and the electrodes 14. The inner circumference of the electrodes may be serrated as illustrated to allow entry of the electrolyte into the cavities between the electrodes. Each electrode may contain three small holes 17 spaced at the vertices of an equilateral triangle to permit electrolyte to fill the spaces between the electrodes when the battery is activated. As described in my said applications Serial Nos. 501,001, now U.S. Patent 2,806,815 and 639,278, now U.S. Patent 2,886,664, activation of the reserve cell battery occurs on firing the projectile in which the battery serves as the source of power for a proximity fuse. Upon firing, an ampoule containing electrolyte located in the central chamber of the battery is broken, and the electrolyte is forced into the annular spaces between each electrode by reason of the centrifugal force developed by the rotation of the projectile.

On top of the electrode 14 is placed an inner washer 18, and an outer washer 19. The inside diameter of the inner washer is the same as, or only slightly larger than the diameter of the cylindrical rod 9 forming part of the mandrel 10, so that a close fit is obtained. The outer diameter of the outer washer is tangential with the four equally spaced indentations on the electrodes, and thus the outer washer is spaced by means of the arms 12 on the supporting device. It is apparent that the spacing of this outer washer 19 determines the length of the integral projections 20 of the plastic sleeving 16. On top of the washers is placed another electrode, followed by two washers, and so on, until as many electrodes are assembled as are required to deliver the desired power and voltage. It is possible by means of the construction illustrated to arrange 50 to 75 electrodes in a stack about two inches high.

After all the electrodes have been assembled, a top cover plate 21 comprising an annular disc, made of metal or rigid plastic material is placed in position. Then a cylindrical clamping member 22 having an inner recess corresponding to the central rod 9 of the mandrel is placed so that it is in contact with the cover plate. Then a clamp nut 23 is inserted through an opening in the clamping member 22 into a threaded recess in the center core 9 of the mandrel 10. By tightening this nut, the pressure on the stack can be regulated. The pressure between the electrodes and the outer washers must be greater than the molding pressure, so that the plastic does not flow between the electrodes and the outer washers during the molding process. On the other hand, the clamping pressure must not exceed the compressive strength of the metal electrodes or the washers. Laminated paper impregnated with a phenolic resin and having a compressive strength of about 32,000 lbs. per sq. in. has been found to be a very suitable material for constructing the washers.

After the clamping member 22 and the clamp nut 23 have been put in place, and the requisite pressure applied to the stack, the assembly is placed in an injection mold as shown in FIGURE 4. The mold illustrated is a two part mold consisting of a sprue bushing 24 and a cavity block 25. The sprue bushing and the cavity block are locked together by means of key 26, and the inner core of the mold is locked to the mold cavity by means of key 27.

In operation the sprue bushing 24 is engaged with the nozzle 28 of an injection molding machine of a conventional type, preferably having automatic controls to regulate the duration of the molding period and the shot size. The injected plastic flows through the sprue 29 and the runners 30, shown partly in elevation and partly in cross-section, to reach the mold cavity formed between the walls of the cavity block and the stacked assembly of electrodes and washers. The plastic fills the mold cavity, and forms the plastic sleeving 16 surrounding the electrodes which are shown partly in cross-section and partly in elevation. The integral projections 20 are formed when the plastic fills the mold cavity by flowing between the electrodes but not past the outer washers 19.

It should be appreciated that the molding operation is a very delicate one since the electrodes are very thin, and usually constructed of relatively weak metals, such as zinc. While the clamping pressure must compensate for the molding pressure, so that the injected plastic does not "break-through" the outer washer and fill the cavities between the electrodes, the clamping pressure should not be so high that the zinc electrodes are crushed or squeezed together. It is preferable to employ the lowest possible molding pressure consistent with the molding properties of the plastic employed, and then adjust the clamping pressure to a value only slightly in excess of that required to compensate for the molding pressure. The center rod of the mandrel serves to support the assembly of electrodes and washers and prevents a collapse of the assembly due to the pressure of the plastic acting on the entire exterior of the assembly.

When plastics are employed which have a relatively high molding temperature i.e. about 390° F., it is sometimes desirable to pre-heat the mold containing the electrode assembly, for instance, by induction heating, to prevent chilling of the injected plastic and consequent increase in its resistance to flow.

The molding conditions will therefore vary somewhat for different plastic compositions. When using "Tenite" brand 2–M resin, a cellulose aceto-butyrate, the following operating conditions have been employed:

| | |
|---|---|
| Gauge pressure on plastic, lbs. per sq. in. | 12,000 |
| Time cycle, seconds | 12 |
| Nozzle temperature, ° F. | 390 |
| Mold temperature, ° F. | 80–350 |
| Shot size, grams | 41 |

Molding compositions containing vinyl resins have proved to be very suitable, because of their good flow properties at reasonably low molding temperatures and pressures. The vinyl resin compositions may be either rigid, semi-rigid, or elastomeric depending on the quantity of plasticizer employed in the compositions. The following are typical examples of vinyl resin injection molding compositions:

I. Rigid molding composition:

| | Percent |
|---|---|
| Copolymer of vinyl chloride and vinyl acetate, combined vinyl chloride about 86% | 94.75 |
| Stabilizer | 2.00 |
| Lubricant | 3.25 |
| | 100.00 |

II. Semi-rigid molding composition:

| | |
|---|---|
| Copolymer of vinyl chloride and vinyl acetate, combined vinyl chloride about 86% | 84.75 |
| Di(2-ethylhexyl) phthalate | 10.00 |
| Stabilizer | 2.00 |
| Lubricant | 3.25 |
| | 100.00 |

III. Elastomeric molding composition:

| | |
|---|---|
| Copolymer of vinyl chloride and vinyl acetate, combined vinyl chloride about 95% | 51.4 |
| Di(2-ethylhexyl) phthalate | 45.0 |
| Stabilizer | 1.5 |
| Lubricant | 2.1 |
| | 100.0 |

The stabilizers employed in the above compositions may be any of the conventional types, such as organometallic tin or lead salts of organic acids, or lead or calcium salts of fatty acids, and the lubricant may comprise a mineral oil, a vegetable oil, a wax or a mixture of oils and waxes.

Any of the above vinyl resin compositions may be molded at pressures of 6000 to 8000 lbs. per sq. in. and nozzle temperatures of 310° F. to 350° F.

When the molding operation is finished, the mold is opened, the clamping member 22 removed, and the assembly withdrawn from the mandrel. After removing the flash, the electrode assembly has the appearance shown in FIGURE 1, which is a cross-sectional view of the assembly. By reason of the indentation 31 in the clamping member 22, the plastic sleeving 16 extends beyond the electrodes in the form of a projection 32. After the devices for storing the electrolyte and providing for its release at the proper moment, which are not part of the present invention, have been inserted in the inner chamber of the battery, a cover disc (not shown) may be heat-sealed in place by forcing the projection 32 over the edges of the cover disc.

The jacket or sleeving 16, even when made of elastomeric material, holds the electrodes and washers firmly in place, so that they will withstand rough handling without becoming dislodged. The gripping action of the sleeving and its projections on the electrode is, in part, assisted by the shrinkage of the plastic on cooling. The jacket also seals the edges of the electrodes to prevent leakage of electrolyte during the flight of the projectile, which is a more difficult problem with other proposed constructions than appears at first glance, since the projectile may rotate at 20,000 r.p.m. and considerable centrifugal force thus may be developed. The jacket also acts to insulate the electrodes from one another and also insulates the electrodes from the surrounding metal can in which the battery is usually encased.

The described method of construction permits accurate alignment of the electrodes so that the electrolyte rapidly makes its way through the passages in the electrodes provided for it, and thus the activation time for the battery is reduced. Furthermore, a large number of electrodes may be stacked in a small pile, which enables the battery to be extremely compact, and yet deliver the required voltage.

The invention is subject to modification within the scope of the appended claims, and the principles of construction described are applicable to the assembly of any multi-cell galvanic battery.

I claim:

1. In a multi-cell galvanic battery, an electrode assembly comprising a plurality of separated electrodes, at least a substantial part of the outer contours of said electrodes being surrounded by a sleeving of plastic selected from the group consisting of the cellulose esters and the vinyl polymers, said sleeving having integral projections extending between the outer edges of the electrodes, said sleeving and projections firmly gripping the electrodes so that the electrodes are rigidly supported.

2. In a multi-cell galvanic battery, an electrode assembly comprising a plurality of generally flat electrodes separated by generally flat washer elements, at least a substantial part of the outer contours of said electrodes being surrounded by an injection-molded sleeving of plastic selected from the group consisting of the vinyl polymers and the cellulose esters, said sleeving having small integral projections extending between the outer edges of the electrodes to meet the outermost edges of said spacing elements, said sleeving and projections firmly gripping the electrodes so that the electrodes are rigidly supported.

3. Process for making an electrode assembly for use in a multi-cell galvanic battery, which comprises forming an assembly of generally flat electrodes and generally flat smaller washer elements, the margins of said elements being within the margins of said electrodes, applying a compressive clamping pressure to said electrodes and spacing elements, forming a molded electrode-supporting plastic sleeving having small integral projections extending between the outermost edges of the electrodes by injecting a plastic material, selected from the group consisting of the vinyl polymers and the cellulose esters, around at least a substantial part of the outer contours of said electrodes while maintaining said clamping pressure, the clamping pressure being regulated with respect to the molding pressure so that no substantial part of the injected plastic material flows between said electrodes and said spacing elements.

References Cited in the file of this patent

UNITED STATES PATENTS

| | | |
|---|---|---|
| 664,198 | Wetherill | Dec. 18, 1900 |
| 690,770 | Reed et al. | Jan. 7, 1902 |
| 2,019,064 | Apple | Oct. 29, 1935 |
| 2,144,574 | MacCallum | Jan. 17, 1939 |
| 2,345,305 | Thornton | Mar. 28, 1944 |
| 2,346,640 | Anthony | Apr. 18, 1944 |
| 2,348,511 | Armel | May 9, 1944 |
| 2,379,971 | Krehbiel | July 10, 1945 |

FOREIGN PATENTS

| | | |
|---|---|---|
| 406,849 | Great Britain | Mar. 8, 1934 |
| 540,591 | Great Britain | Oct. 22, 1941 |

OTHER REFERENCES

"Modern Plastics" magazine, article by Charles Kleiderer, November 1945, pp. 133, 134, 135, 136, 206.

"Plastics" magazine, article by Charles C. Henry, December 1945, pp. 50, 52 and 54.